United States Patent [19]

Gouw

[11] Patent Number: 4,537,605
[45] Date of Patent: Aug. 27, 1985

[54] REMOVAL OF HYDROGEN SULFIDE FROM ELEMENTAL SULFUR BY A COUNTERCURRENT WET STEAM PROCESS

[75] Inventor: T. H. Gouw, El Cerrito, Calif.

[73] Assignee: Chevron Research Company, San Francisco, Calif.

[21] Appl. No.: 574,948

[22] Filed: Jan. 30, 1984

Related U.S. Application Data

[63] Continuation of Ser. No. 398,804, Jul. 16, 1982, abandoned.

[51] Int. Cl.³ .............................................. B01D 53/14
[52] U.S. Cl. ............................................ 55/48; 55/54; 55/73; 423/573 G; 423/578 R
[58] Field of Search .................. 55/48, 52, 54, 61, 73; 423/210.5, 220, 242 R, 567 A, 572, 578 R, 578 A, 571, 573 G

[56] References Cited

U.S. PATENT DOCUMENTS

| | | | |
|---|---|---|---|
| 1,972,884 | 9/1934 | Gleason et al. ................ | 55/73 X |
| 1,972,885 | 9/1934 | Gleason et al. ................ | 55/73 X |
| 1,992,611 | 2/1935 | Grindrod ...................... | 423/578 X |
| 2,077,028 | 4/1937 | Bacon et al. .................. | 423/572 |
| 2,092,625 | 9/1937 | Rich ............................ | 423/578 |
| 2,841,536 | 7/1958 | Egbert .......................... | 423/578 A |
| 3,273,966 | 9/1966 | Bowling et al. ............... | 423/578 A |
| 3,304,158 | 2/1967 | Dale ............................ | 423/578 |
| 3,647,398 | 3/1972 | Goldberger ................... | 423/578 A |
| 3,961,035 | 6/1976 | Mickley ........................ | 423/572 X |
| 4,002,728 | 1/1977 | DeMay .......................... | 423/578 R |
| 4,131,437 | 12/1978 | Campbell et al. .............. | 55/53 |

FOREIGN PATENT DOCUMENTS

| | | | |
|---|---|---|---|
| 964040 | 3/1975 | Canada ......................... | 423/578 |
| 50-74597 | 6/1975 | Japan .......................... | 423/578 R |
| 51-35693 | 3/1976 | Japan .......................... | 423/578 |
| 471839 | 9/1937 | United Kingdom ............. | 423/578 |
| 653304 | 5/1951 | United Kingdom ............. | 423/578 |
| 733604 | 7/1955 | United Kingdom ............. | 423/578 R |

*Primary Examiner*—Robert Spitzer
*Attorney, Agent, or Firm*—Burns, Doane, Swecker & Mathis

[57] ABSTRACT

Hydrogen sulfide is removed from molten petroleum byproduct sulfur to levels below 1 ppm by weight by contacting the sulfur in countercurrent with wet steam. Preferably, the wet steam is sour water steam and the contacting is carried out in a packed bed column.

6 Claims, 1 Drawing Figure

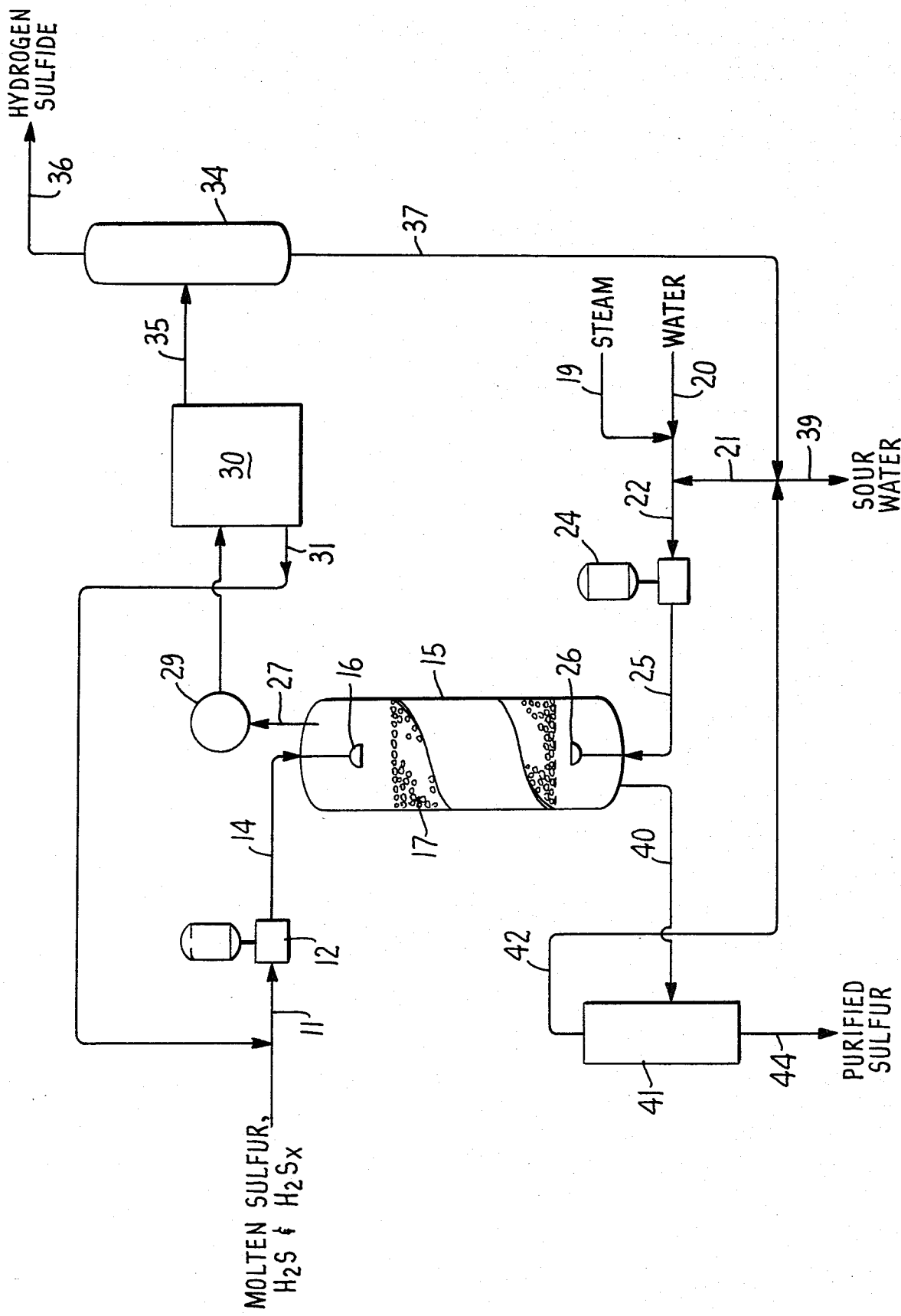

REMOVAL OF HYDROGEN SULFIDE FROM ELEMENTAL SULFUR BY A COUNTERCURRENT WET STEAM PROCESS

This application is a continuation of application Ser. No. 398,804, filed July 16, 1982, now abandoned.

BACKGROUND OF THE INVENTION

1. Field of the Invention

This invention is in the field of sulfur purification. More particularly, it relates to a process for removing hydrogen sulfide contamination from sulfur.

2. Prior Art

Molten sulfur, when obtained as a byproduct of crude oil refining, contains substantial amounts of hydrogen sulfide as it comes out of the Claus reactors and goes into the storage pits. In these reservoirs the amount of dissolved hydrogen sulfide generally ranges between 20 and 1000 ppm and especially between 50 and 100 ppm. In periods of unstable operation, they may contain even more hydrogen sulfide such as 2000 ppm or more. This creates odor problems and personnel hazards, not only around these storage tanks and at the sulfur delivery points but also in and around the tank trucks and railroad tank cars used to transport this product.

With more than 40 ppm hydrogen sulfide in the liquid, the vapor in equilibrium with the liquid is highly combustible. But even at levels as low as 1 to 2 ppm hydrogen sulfide in the liquid, the corresponding vapors are still toxic to human life. Fatalities and near fatal accidents occur with disquieting frequency.

The most widely used modern sulfur purification units are based on the French SNPA process, where the hydrogen sulfide is removed by sparging air through the molten sulfur. Under the French design conditions the major drawback of this process is that it is slow; in addition, even a standard three-stage version does not reduce the hydrogen sulfide level in the final product to less than 5 ppm. Although this is adequate to eliminate explosion hazards, it is still insufficient to ensure operational safety.

Water washing of molten sulfur has also been used to reduce hydrogen sulfide levels. U.S. Pat. No. 4,002,728 of DeMay describes such a process. This process is marginally better than the SNPA process. It has the failing of requiring multiple stages and high water use levels to reduce hydrogen sulfide below about 1 ppm. In fact, with 2 parts by volume of water per part of sulfur in a single stage generally from 10 to 15 ppm of hydrogen sulfide remains. This patent suggests mixing and heating the sulfur-water mixture with steam but in general teaches against such vapor phase stripping.

Concurrent contact of atomized sulfur and steam at 120° C.–160° C. is shown to remove hydrogen sulfide to from 7 to 33 ppm levels in Japanese Kokai Shō 49-108312 of Nippon Kihatsuya Co., Ltd., while Kokai Shō 48-123653 of Nippon Sekiyu Co., Ltd. discloses that injecting small amounts (0.15 kg/kg . hr) of steam into molten sulfur for 2 to 4 hours can reduce hydrogen sulfide levels to about 10 ppm.

Three other patent references which are of interest to the present process are U.S. Pat. No. 3,273,966 of Bowling, et al, which discloses the removal of $CS_2$, iron and sulfur chloride from sulfur produced as a byproduct of $CCl_4$ production, by means of contact with heated water; U.S. Pat. No. 3,647,398 of Goldberger which uses a countercurrent contacting of crude sulfur with hot water to remove gange therefrom; and U.S. Pat. No. 4,131,437 where hydrogen sulfide is removed from liquid sulfur by contact with a carrier gas.

It is the object of this invention to provide an improved process for very thoroughly removing hydrogen sulfide from elemental sulfur.

STATEMENT OF THE INVENTION

It has now been found that hydrogen sulfide is thoroughly removed from molten petroleum byproduct sulfur initially containing from 20 to 2,000 ppm of hydrogen sulfide by countercurrent contacting with low pressure wet steam at elevated temperatures. In this process, the molten sulfur is flowed downward through an upward stream of wet steam. The aqueous phase is turbulent so as to break up the sulfur stream into droplets. Preferably the wet steam is made from a sour water recycle that has a pH of about 4 to 7. The contacting is at a temperature of from 260° to 320° F. and a superatmospheric pressure adequate to assure that the aqueous phase is partially liquid. The contacting period is for up to about 1 hour. The contacting removes hydrogen sulfide by two mechanisms. A portion of the hydrogen sulfide is absorbed into the wet steam. A portion reacts with water in the wet steam to form elemental sulfur. Thereafter the hydrogen sulfide-rich wet steam phase and the hydrogen sulfide-free elemental sulfur are separated and recovered.

BRIEF DESCRIPTION OF THE DRAWING

The invention will be further described with reference to the drawing in which the sole FIGURE is a schematic illustration of the process of this invention.

DETAILED DESCRIPTION OF THE INVENTION

Hydrogen sulfide dissolves in elemental sulfur. In solution, the hydrogen sulfide is present mostly in equilibrium with hydrogen polysulfides. The polysulfide-hydrogen equilibrium reaction $$H_2S + S_{x-1} \rightleftharpoons H_2S_x$$

must be considered in any hydrogen sulfide removal process. To be successful, it is necessary for the equilibrium to be shifted completely to the left. In a pure stripping, the physical removal of hydrogen sulfide is the sole factor that draws the reaction to the left. This is likely the rate-determining factor in the French SNPA process. In the presence of wet steam, the rate of polysulfide removal is increased. At the water-sulfur interface, the following reactions take place:

$$H_2S_x + 2H_2O \rightleftharpoons H_2S_{x-1} + H_2S + 2OH^-$$

$$H_2S, \text{ liquid S} \rightleftharpoons H_2S, \text{ liquid water}$$

The net result, therefore, is the movement of $H_2S_x$ in the molten sulfur to $H_2S$ in the aqueous phase.

Thus, it is essential for highest effectiveness that the temperature and pressure employed during the contacting be such as to prevent a "dry steam" environment. That is, the steam should contain some entrained unvaporized water.

The lowest usable temperature is a bit above the melting point of sulfur, say 230° F. The highest usable temperature is about 320° F. since at higher temperatures the sulfur becomes viscous and the reverse Claus reaction

$S + 2H_2O \rightarrow H_2S + SO_2$ becomes a counterproductive factor. Preferred temperatures are from 250° F. to 310° F. with 275° F. to 290° F. being the most preferred range.

The operating pressure range is 15 to 75 psig, with the preferred range to be 20 to 40 psig. The pressure determines the system's temperature in the presence of wet steam. At too low pressures, the resulting temperatures may result in the formation of solid sulfur. At too high pressure, high temperature problems just described are encountered.

The steam consumption rate is on the order of 0.3 to 2 lb steam/lb sulfur. Preferably, it is from 0.4 to 1.5 lb steam/lb sulfur. Starting with a feed of 110–120 ppm hydrogen sulfide, one obtains a 0.5–0.6 ppm hydrogen sulfide product at the lower preferred steam consumption; at the higher preferred steam rate, the residual hydrogen sulfide was decreased to 0.2–0.3 ppm hydrogen sulfide. It is obviously possible to use more steam such as up to 10 lb steam/lb of sulfur although this is wasteful in view of the high removal efficiencies noted with lesser amounts of steam. It is also possible to use somewhat lower steam rates such as 0.3 lb/lb if less complete hydrogen sulfide removal can be tolerated.

In this process, the wet steam performs three functions: (1) It provides the necessary agitation to effectively disperse and mix the sulfur and the water. (2) It provides the necessary water to catalyze the removal of the polysulfides from the sulfur. (3) It provides the gas flow to strip off the hydrogen sulfide.

The use of sour water steam yields better results than fresh water steam. This is attributable to the lower pH of the sour recycle (approximately 6) while the fresh water has a pH of approximately 8 to 9. Preferred pHs are in the range of 5 to 7. At these pHs unexpectedly higher hydrogen sulfude removal efficiencies are observed. Such recycle can lead to substantially lower net water usage than the gross steam would suggest.

In a preferred embodiment, the invention is carried out in a zone containing a surface area expander such as is generally employed in mass transfer operations, for example in distillation, extraction, absorption and the like. These expanders can be screens, mesh, or a bed of conventional column packings. These can include inert particulate materials such as glass, refractory, polymeric or inert metal rings, helices, saddles, spheres, pellets or the like. Functionally, the packing is provided to break up the flow of the sulfur and steam through the column, promote their admixture and promote mass transfer of the hydrogen sulfide out of the sulfur phase. In general such packing can give a void fraction of from about 0.25 to about 0.95, preferably from about 0.33 to 0.90, and most, preferably from about 0.40 to 0.85.

The median residence time of the sulfur in the column can range from about 0.25 minutes to about one hour or more. Preferably, the residence time is from about 0.50 minutes to 20 minutes. In general terms, the temperature and water/steam conditions specified herein favor the removal of hydrogen sulfide as opposed to hydrogen sulfide generation. Accordingly, longer times will lead to lower hydrogen sulfide levels so that, based on hydrogen sulfide levels sought, the feed rates can be varied until the levels desired are obtained.

The rate of sulfur and water feed to the column is controlled. Preferably, the linear hourly space velocity (LHSV) of the materials, calculated with water as a liquid, is from about 1.0 to 30 bed void volumes per hour with LHSVs of from 2 to 25 hrs$^{-1}$ being preferred.

Turning now to the drawing, in the figure molten refinery byproduct sulfur contaminated with from about 20 to 1000 ppm by weight of hydrogen sulfide and hydrogen polysulfide, but more commonly 20 to 200 ppm by weight of such material, is fed through line 11 to pump 12 by which it is driven through line 14 into the top of extraction column 15. The molten sulfur is dispersed through sparger 16 on top of packed bed 17. Bed 17 is comprised of glass helices and has a void volume of about 65%. A mixture of steam, makeup water and sour water provided via lines 19, 20 and 21, respectively, is fed through line 22 to compresser/pump 24 and then pressured through line 25 to the bottom of bed 17 in column 15 where it is dispersed as wet steam via sparger 26. The wet steam expands in column 15 turbulently mixing with the descending sulfur. The pressure in column 15 is from 20 to 40 psig and the temperature is 275° F. to 290° F. This pressure and temperature are controlled to assure that this is a three phase system of liquid water, steam and liquid sulfur, i.e., wet steam and sulfur.

A mixture of wet steam and hydrogen sulfide is taken off the top of column 15 via line 27 to condenser 29. The condensate is passed to phase separator 30 where any entrained molten sulfur is settled out as a bottoms and removed via line 31 and preferably recycled to line 11. The aqueous phase comprising water and hydrogen sulfide is preferably fed to stripping column 34 via line 35 where hydrogen sulfide is taken overhead and removed via line 36 while sour water is removed as a bottoms via line 37 to disposal via line 39 and partially recycled via line 21. A purified sulfur stream, containing less than 1 ppm of hydrogen sulfide is removed from the bottom of column 15 via line 40 to phase separator 41. In phase separator 41 any water entrained in the sulfur is taken off as a top phase and removed via line 42 while the sulfur-free water either is recycled to line 21 as shown or may be discarded. Purified sulfur is removed as bottoms from separator 41 via line 44.

EXAMPLE

A pilot scale continuous hydrogen sulfide extraction column was set up. It was two inches in diameter and 3 feet long. It was packed to a height of 2½ feet with 4.5 mm glass helices. The void fraction was estimated to be 0.77. In the course of operations the bed compacted to a height of 2 feet reducing the void fraction to about 0.62.

A laboratory metering pump pumped fresh or sour water from a feed graduate through a tube and shell heat exchanger with controlled pressure steam on the shell side. The water picked up enough heat in this exchanger to be converted to steam prior to entering the bottom of the extraction column. This approach permitted close control of the amount of wet steam metered into the system. The sulfur was taken off from the bottom of the column through a heated valve into a sample container.

A vapor phase comprising steam and hydrogen-sulfide was taken off from the top of the column. Some entrainment of sulfur in this phase was observed. This could be corrected either by using the settler shown in the drawing or by adding "demisters" or the like known to the art. Both sour recycle water (pH of 6) and fresh water (pH of 9) was used to generate the wet steam. The flow rate of sulfur and water to the column was varied as was the column temperature. The pressure was held at between about 20 psig and 40 psig. The data derived from these runs are given in Table I.

TABLE I

Removal of Hydrogen Sulfide From Sulfur By Steam Stripping in Packed Bed

| Run # | Flowrates ml/min · cm² S | H₂O | H₂O/S vol/vol | H₂O/S wt/wt | Water Quality | Temperature, °F. Steam Inlet | Column Bottom | Column Top | H₂S Levels ppm In | Out |
|---|---|---|---|---|---|---|---|---|---|---|
| A | 2.19 | 2.47 | 1.13 | 0.57 | sour | 332 | 266 | 265 | 110 | 0.6 |
| B | 1.91 | 5.42 | 2.84 | 1.42 | sour |  |  | 270 | 110 | 0.2 |
| C | 1.27 | 2.86 | 2.25 | 1.12 | sour | 322 | 309 | 265 | 114 | 0.2 |
| D | 1.39 | 2.78 | 2.00 | 1.10 | sour | 283 | 278 | 266 | 125 | 0.2 |
| E | 1.43 | 2.78 | 1.95 | 0.97 | sour | 286 | 290 | 302 | 125 | 0.5 |
| F | 1.27 | 2.86 | 2.25 | 1.12 | fresh | 271 | 271 | 269 | 114 | 0.1 |
| G | 1.39 | 2.78 | 2.00 | 1.00 | fresh | 268 | 268 | 266 | 125 | 0.5 |
| H | 2.19 | 2.47 | 1.13 | 0.57 | fresh | 344 | 281 | 265 | 110 | 0.5 |

For the purpose of comparison the following experiments were run:

I. A sample of the molten petroleum byproduct sulfur containing 100 to 120 ppm of hydrogen sulfide plus poly(sulfides) was thoroughly admixed with 2 parts by volume of fresh water, heated to 285° F.-300° F., and thoroughly shaken. The phases were separated and the hydrogen sulfide plus poly(sulfides) residual in the sulfur was still 10 to 15 ppm such that the product was not acceptable.

II. A run was made using the apparatus of the Example at higher than recommended temperatures—i.e., at 310° F.-330° F. and at relatively low steam usage levels—0.5 lb per lb of sulfur. The product contained from 22 to 35 ppm of hydrogen sulfide and was not acceptable.

III. A run was made using the apparatus of the Example but with "dry" steam instead of "wet" steam. The sulfur feed rate was 1.04 ml/min . cm² of column cross-section of 37 ppm hydrogen sulfide sulfur. 2.49 ml/min. cm² of column cross-section of water equivalent of dry steam was used. The column temperature was 265° F.-287° F. The final product contained 7 ppm of hydrogen sulfide and was not acceptable.

What is claimed is:

1. A process for reducing the hydrogen sulfide content of hydrogen sulfide-contaminated petroleum byproduct elemental sulfur from 20 to 2000 pm by weight to less than 1 ppm by weight which comprises passing the elemental sulfur in liquid phase downward in countercurrent through upward flowing water and steam in a single contacting at a temperature of from 250° F. to 310° F., a pressure adequate to prevent total vaporization of the water and a water plus steam usage of from 0.3 to 2 pounds per pound of sulfur, wherein the water and steam is partially vaporized sour water having a pH of 4 to 7.

2. The process of claim 1 wherein said water plus steam is sour wet steam of pH 5 to 7 prepared from recycle overhead condensate.

3. The process of claim 2 wherein said passing in countercurrent is effected in a packed bed column.

4. The process of claim 3 wherein said temperature is from 275° F. to 290° F.

5. The process of claim 4 wherein said water plus steam usage is from 0.5 to 1.5 pounds per pound of sulfur.

6. The process of claim 5 wherein said pressure is from 20 to 40 psig.

* * * * *